United States Patent
Ragupathi et al.

(10) Patent No.: US 9,639,408 B1
(45) Date of Patent: May 2, 2017

(54) SYSTEMS AND METHODS FOR CUSTOMIZING INDICATOR CODES BEHAVIOR

(71) Applicant: Dell Products L.P., Round Rock, TX (US)

(72) Inventors: Dinesh Kunnathur Ragupathi, Round Rock, TX (US); Arun Muthaiyan, Round Rock, TX (US); Kala Sampathkumar, Bangalore (IN); Yogesh Prabhakar Kulkarni, Round Rock, TX (US); Abhijeet R. Singh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/877,483

(22) Filed: Oct. 7, 2015

(51) Int. Cl.
*G06F 9/54* (2006.01)
*G06F 9/50* (2006.01)

(52) U.S. Cl.
CPC ............ *G06F 9/542* (2013.01); *G06F 9/5011* (2013.01)

(58) Field of Classification Search
CPC .............................. G06F 9/542; G06F 9/5011
See application file for complete search history.

(56) References Cited

U.S. PATENT DOCUMENTS

| | | |
|---|---|---|
| 7,096,155 B2 | 8/2006 | Chen et al. |
| 2011/0309947 A1* | 12/2011 | Zhang ................. G06F 3/04817 340/691.8 |
| 2012/0133520 A1* | 5/2012 | Chang .................... G11B 33/10 340/635 |
| 2016/0072642 A1* | 3/2016 | Shih .................... H04L 12/4666 370/392 |
| 2016/0116961 A1* | 4/2016 | Kunnathur Ragupathi ............ G06F 1/3206 713/320 |

* cited by examiner

*Primary Examiner* — Syed Roni
(74) *Attorney, Agent, or Firm* — Jackson Walker L.L.P.

(57) ABSTRACT

In accordance with embodiments of the present disclosure, an information handling system may include a processor and a management controller communicatively coupled to the processor for out-of-band management of the information handling system. The management controller may be configured to receive an event relating to an information handling resource of the information handling system and communicate a command to the information handling resource for applying a customized indicator code behavior to a visual indicator associated with the information handling resource.

18 Claims, 4 Drawing Sheets

SYSTEMS AND METHODS FOR CUSTOMIZING INDICATOR CODES BEHAVIOR

TECHNICAL FIELD

The present disclosure relates in general to information handling systems, and more particularly to systems and methods for providing for customizable indicator codes behavior of visual indicators of any information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems and components thereof may include one or more visual indicators (e.g., light-emitting diode, liquid crystal display, other source of light, or other visually-perceptible mechanism) for communicating information (e.g., status, alert, warning, etc.) regarding the information handling systems or a component thereof. Despite the utility of such visual indicators, different generations of information handling systems, different generations of components, information handling systems from different vendors, and/or components from different vendors may provide different indicator code behavior (e.g., visual indications) on the visual indicators for identical or similar alerts. For example, a "blinking green" indicator code behavior for a light-emitting diode (LED) on one generation of an information handling system may indicate the occurrence of one event, while the same indicator code on another generation of the information handling system may indicate the occurrence of another event. Similarly, as another example, a "blinking amber" indicator code behavior for a light-emitting diode (LED) on an information handling system manufactured by one vendor may indicate the occurrence of one event, while the same indicator code on an information handling system manufactured by another vendor may indicate the occurrence of another event. In a large data center or enterprise environment having dozens, hundreds, or thousands of heterogeneous information handling systems and components, understanding indicator code behaviors may be cumbersome, even to the point that it is difficult to make practical use of visual indicators.

SUMMARY

In accordance with the teachings of the present disclosure, the disadvantages and problems associated with existing approaches to providing visual alerts associated with an information handling system may be reduced or eliminated.

In accordance with embodiments of the present disclosure, an information handling system may include a processor and a management controller communicatively coupled to the processor for out-of-band management of the information handling system. The management controller may be configured to receive an event relating to an information handling resource of the information handling system and communicate a command to the information handling resource for applying a customized indicator code behavior to a visual indicator associated with the information handling resource.

In accordance with these and other embodiments of the present disclosure, a method may include receiving an event relating to an information handling resource of an information handling system and communicating a command to the information handling resource for applying a user-customized indicator code behavior to a visual indicator associated with the information handling resource.

In accordance with these and other embodiments of the present disclosure, an article of manufacture may include a non-transitory computer-readable medium and computer-executable instructions carried on the computer-readable medium, the instructions readable by a processor. The instructions, when read and executed, may cause the processor to receive an event relating to an information handling resource of an information handling system and communicate a command to the information handling resource for applying a user-customized indicator code behavior to a visual indicator associated with the information handling resource.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1:
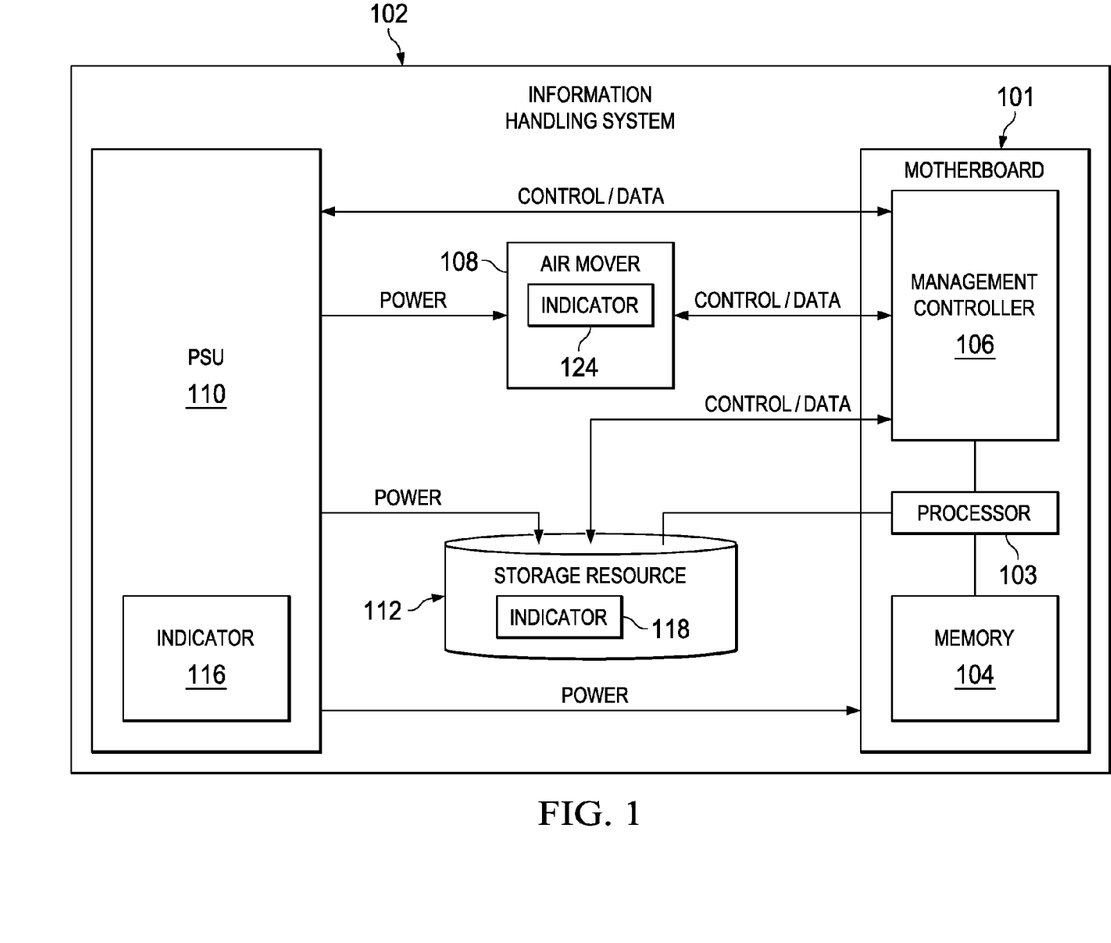
FIG. 1 illustrates a block diagram of an example information handling system, in accordance with embodiments of the present disclosure.

FIG. 1 illustrates a block diagram of an example of an information handling system 102. As depicted, information handling system 102 may include a motherboard 101, an air mover 108, a power supply unit (PSU) 110, a storage resource 112, and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, memory 104, a management controller 106, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Management controller 106 may be configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with other information handling resources of information handling system 102 (e.g., air mover 108, PSU 110, storage resource 112) to communicate control and/or telemetry data between management controller 106 and such information handling resources. For example, an information handling resource may communicate information regarding status and/or health of such information handling resource and/or measurements of electrical parameters (e.g., electrical currents or voltages) present in such information handling resource. In these and other embodiments, management controller 106 may issue commands or other messages for controlling/managing information handling resources. In some embodiments, communication between management controller 106 and another information handling resource may be via a systems management interface such as, for example, Inter-Integrated Circuit (i2C), System Management Bus (SMBus) or Power Management Bus (PMBus).

In some embodiments, as described in greater detail below, management controller 106 may be operable to provide for user configurability of custom indicator code behaviors for visual indicators of information handling resources of information handling system 102.

Air mover 108 may be communicatively coupled to management controller 106, and may include any mechanical or electro-mechanical system, apparatus, or device operable to move air and/or other gases. In some embodiments, air mover 108 may comprise a fan (e.g., a rotating arrangement of vanes or blades which act on the air). In other embodiments, air mover 108 may comprise a blower (e.g., a centrifugal fan that employs rotating impellers to accelerate air received at its intake and change the direction of the airflow). In these and other embodiments, rotating and other moving components of air mover 108 may be driven by a motor. The rotational speed of such motor may be controlled by suitable control signals communicated from management controller 106 or another controller for air mover 108. In operation, air mover 108 may cool information handling resources of information handling system 102 by drawing cool air into an enclosure housing the information handling resources from the outside of the housing, expel warm air from inside the enclosure to the outside of such enclosure, and/or move air across one or more heatsinks (not explicitly shown) internal to the enclosure to cool one or more information handling resources.

Generally speaking, PSU 110 may be communicatively coupled to management controller 106 and may include any system, device, or apparatus configured to supply electrical current to one or more information handling resources of information handling system 102 in order that such one or more information handling resources may operate.

Storage resource 112 may be communicatively coupled to processor 103 and/or management controller 106 and may include any system, device, or apparatus operable to store information processed by processor 103. Storage resource 112 may include, for example, one or more direct access storage devices (e.g., hard disk drives), and/or one or more sequential access storage devices (e.g., tape drives).

As shown in FIG. 1, each of air mover 108, PSU 110, and storage resource 112 may include a visual indicator 124, 116, or 118. Each visual indicator 114, 116, and 118 may include any device, system, or apparatus for providing a human-perceptible visual indication to a user of an event related to the information handling resource (e.g., air mover 108, PSU 110, or storage resource 112) in which it is integrated or otherwise associated. In some embodiments, a visual indicator 124, 116, and/or 118 may comprise an LED. Although visual indicators 124, 116, and 118 are shown as integral to air mover 108, PSU 110, and storage resource 112, respectively, in some embodiments a visual indicator may be separate from its associated information handling resource. In addition, although visual indicators 124, 116, and 118 are shown as associated with air mover 108, PSU 110, and storage resource 112, one or more other visual indicators may be present to provide human-perceptible visual indication to a user of an event associated with another information handling resource.

In addition to motherboard 101, processor 103, memory 104, management controller 106, air mover 108, PSU 110, and storage resource 112, information handling system 102 may include one or more other information handling resources.

Figure 2:
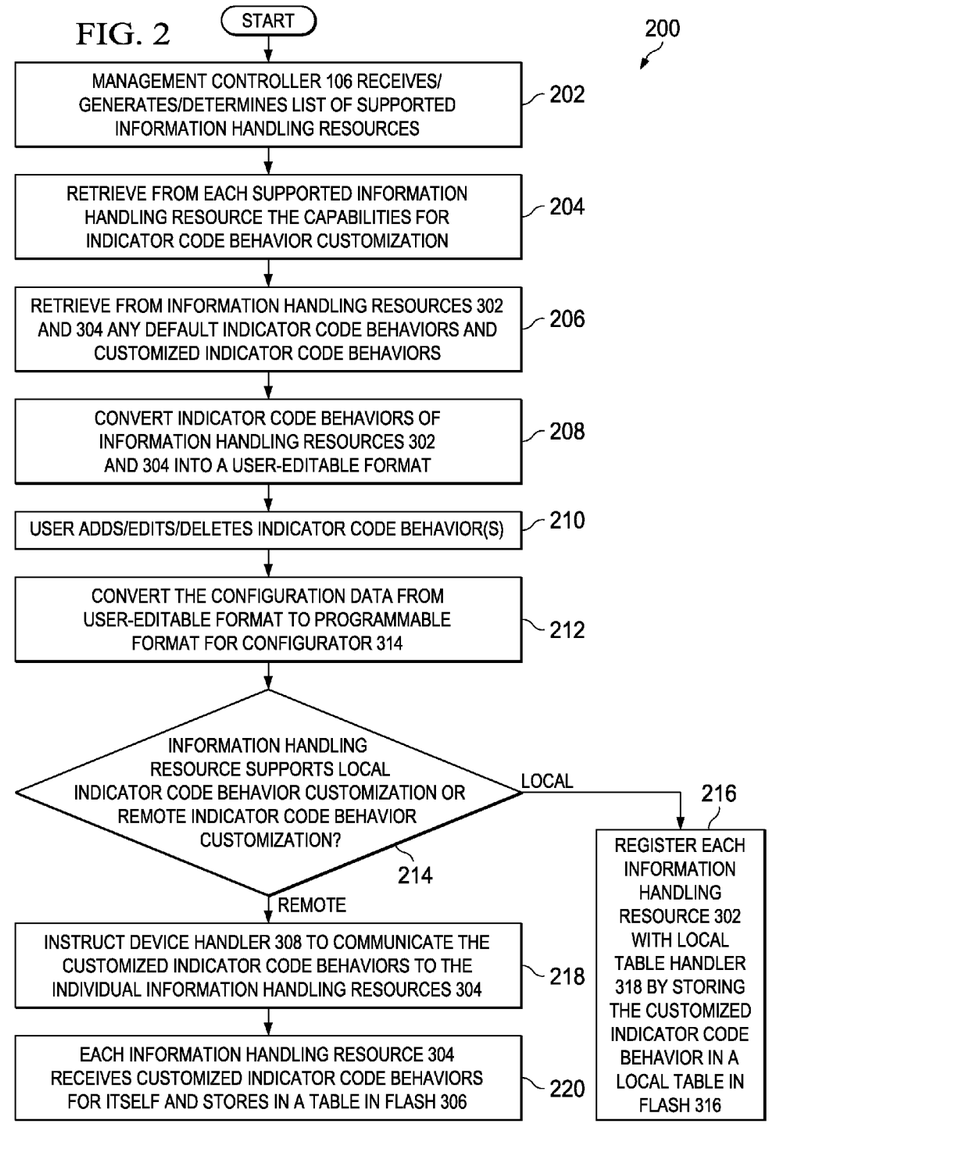
FIG. 2 illustrates a flow chart of an example method for setting a customized indicator code behavior, in accordance with embodiments of the present disclosure.

FIG. 2 illustrates a flow chart of an example method 200 for setting a customized indicator code behavior, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

Figure 3:
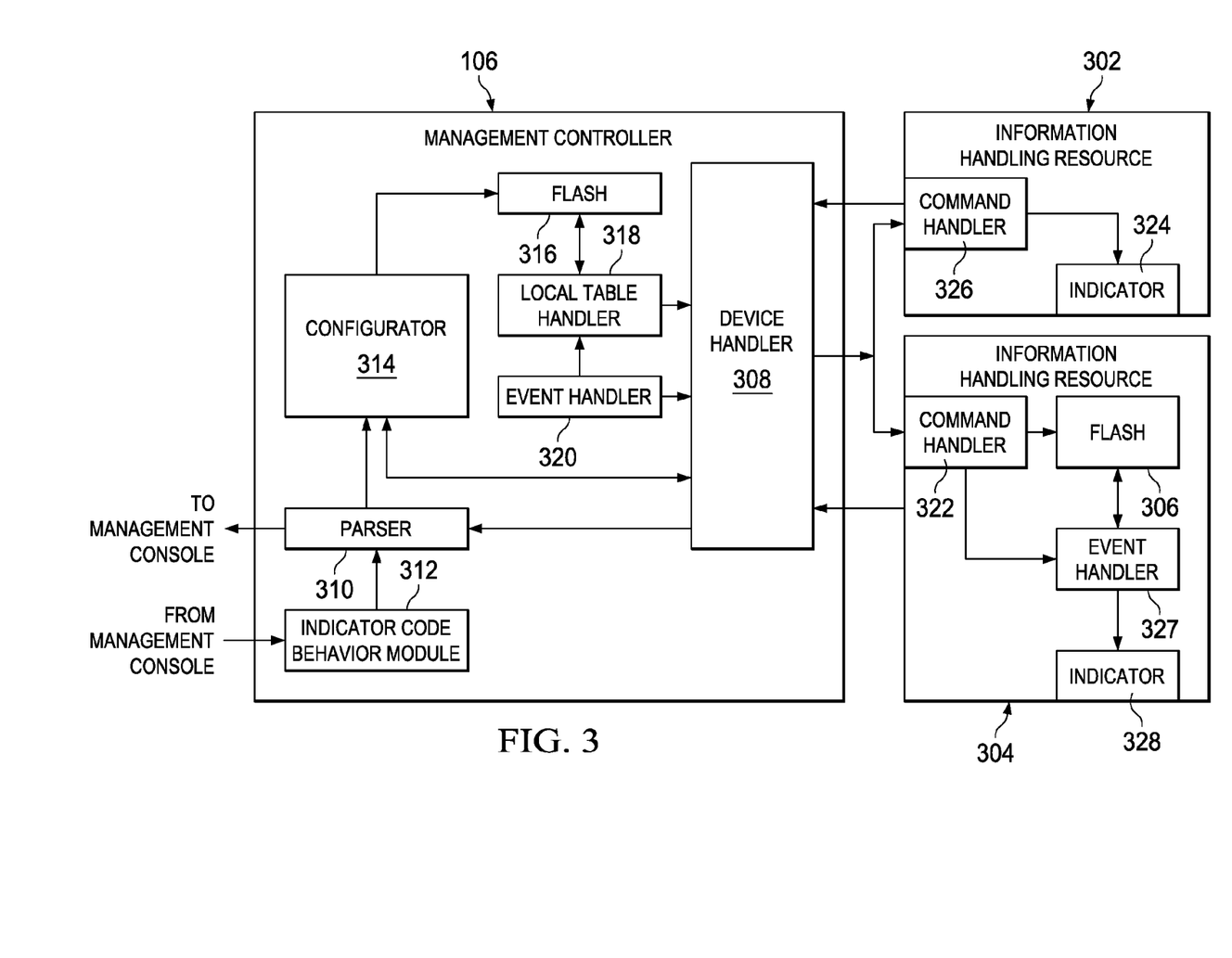
FIG. 3 illustrates a block diagram of functional components for customizing indicator code behaviors for information handling resources, in accordance with embodiments of the present disclosure.

Description of method 200 may be further understood by reference to FIG. 3. FIG. 3 illustrates a block diagram of functional components for customizing indicator code behaviors for an information handling resource 302 having local capability for customizing indicator code behaviors, and an information handling resource 304 having remote capability for customizing indicator code behaviors, in accordance with embodiments of the present disclosure.

At step 202, management controller 106 may receive, generate, or otherwise determine a list of information handling resources which management controller 106 supports for management operations. At step 204, a device handler 308 of management controller 106 may retrieve from each supported information handling resource the capabilities for indicator code behavior customization. For example, such capabilities may include whether such information handling resource supports remote indicator code behavior customization in which the information handling resource includes within itself advanced functionality for receiving a notification of an event and handling such event notification itself to cause an indicator of the information handling resource to respond to the event according to a customized indicator code behavior for such event. As another example, such capabilities may include whether such information handling resource supports only local indicator code behavior customization, in which event handling is performed by management controller 106 to generate raw indicator control commands that management controller 106 communicates to the information handling resource to control indicator behavior.

At step 206, device handler 308 of management controller 106 may retrieve from information handling resources 302 and 304 any default indicator code behaviors and for information handling resource 304, customized indicator code behaviors already stored on information handling resource 304, which may be stored in a flash memory 306 or other memory of information handling resource 304. At step 208, a parser 310 of management controller 106 may convert indicator code behaviors of information handling resources 302 and 304 into a user-editable format. For example, indicator code behaviors as retrieved from information handling resources 302 and 304 may be in a binary format, and parser 310 may convert such binary format to an application programming interface (API) format for editing such indicator code behaviors by a user interfacing with a management console communicatively coupled to management controller 106.

At step 210, a user may interact through the management console with an indicator code behavior module 312 wherein the user may add an indicator code behavior, delete an indicator code behavior, edit an existing indicator code behavior, and/or enable or disable functionality of indicators. In some embodiments, a user may be able to add, edit, and/or delete an indicator code behavior for a single information handling resource (e.g., edit indicator code behavior of a single information handling resource in response to a single event). In these and other embodiments, a user may be able to add, edit, and/or delete an indicator code behavior for a type of class of information handling resources communicatively coupled to management controller 106 (e.g., a batch edit of indicator code behavior such that a certain type of information handling resource, such as all storage resources coupled to management controller 106, have the same indicator code behavior in response to the same or similar event).

At step 212, in response to the user's configuration of indicator code behaviors, parser 310 may convert the configuration data from user-editable format to programmable format (e.g., binary) for configurator 314. At step 214, configurator 314 may determine whether each customized indicator code behavior is for an information handling resource supporting local indicator code behavior customization or remote indicator code behavior customization. For information handling resources 302 supporting local indicator code behavior customization, method 200 may proceed to step 216. For information handling resources 304 supporting remote indicator code behavior customization, method 200 may proceed to step 218.

At step 216, for information handling resources 302 supporting local indicator code behavior customization, configurator 314 may, for each information handling resource 302 in which a customized indicator code behavior is set, register the information handling resource 302 with local table handler 318 by storing the customized indicator code behavior in a local table in flash 316 or another computer-readable medium integral or otherwise accessible to management controller 106.

At step 218, for information handling resources 304 supporting remote indicator code behavior customization, configurator 314 may, for each information handling resource 304 in which a customized indicator code behavior is set, instruct device handler 308 to communicate the customized indicator code behaviors to the individual information handling resources 304. At step 220, in response to the communication of the customized indicator code behaviors to the individual information handling resources 304, each information handling resource 304 may receive the customized indicator code behaviors for itself and store such customized indicator code behaviors in a table in flash 306 or other computer-readable media integral to or otherwise accessible to such information handling resource 304.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Figure 4:
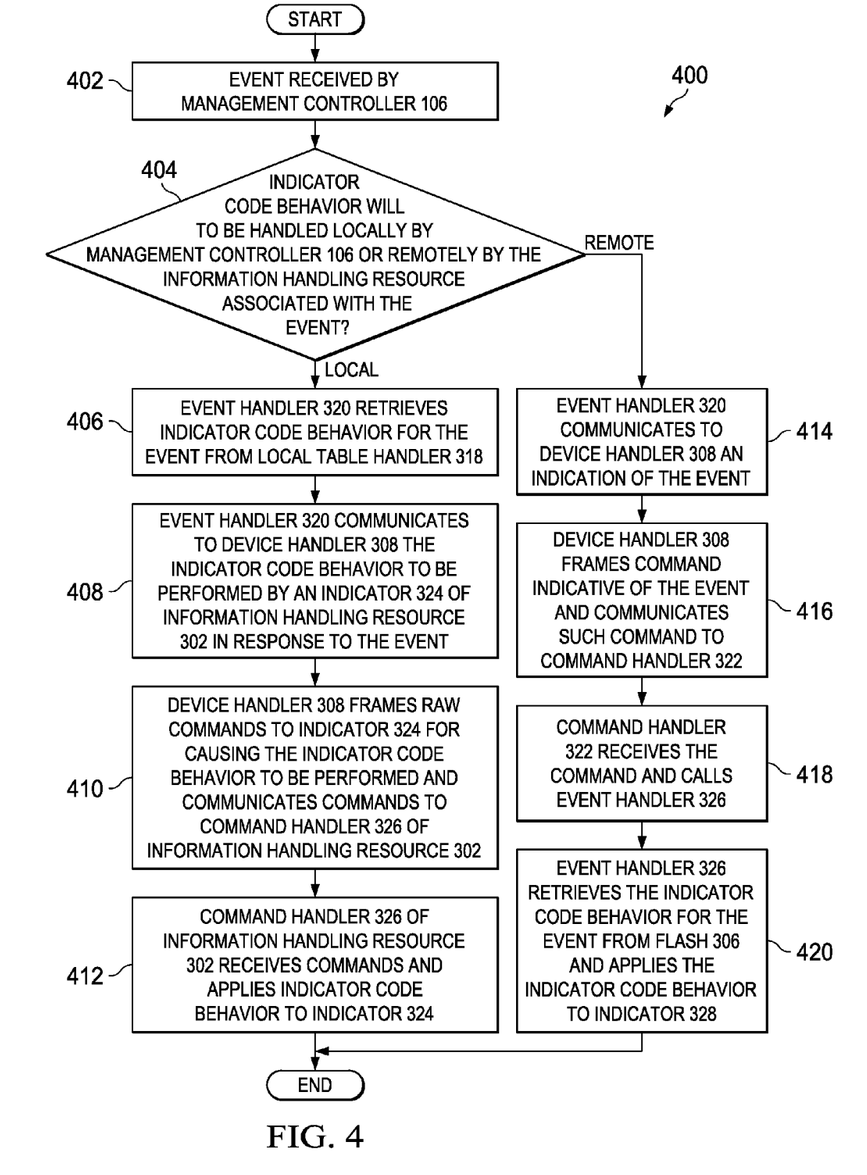
FIG. 4 illustrates a flow chart of an example method for displaying a customized indicator code behavior in response to an event, in accordance with embodiments of the present disclosure.

FIG. 4 illustrates a flow chart of an example method 400 for displaying a customized indicator code behavior in response to an event, in accordance with embodiments of the present disclosure. According to some embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, an event relating to an information handling resource may be received by management controller 106. At step 404, event handler 320 of management controller 106 may determine if the indicator code behavior will be handled locally by management controller 106 or remotely by the information handling resource associated with the event. If to be handled locally, method 400 may proceed to step 406. If to be handled remotely, method 400 may proceed to step 414.

At step 406, event handler 320 may retrieve the indicator code behavior for the event from local table handler 318 (which may read a local table from flash 316 to determine the indicator code behavior). At step 408, event handler 320 may communicate to device handler 308 the indicator code behavior to be performed by an indicator 324 of information handling resource 302 in response to the event. At step 410, device handler 308 may frame raw commands to indicator 324 for causing the indicator code behavior to be performed and communicate such raw commands to command handler 326 of information handling resource 302. At step 412, command handler 326 of information handling resource 302 may receive the commands and apply the indicator code behavior to indicator 324. After completion of step 412, method 400 may end.

At step 414, event handler 320 may communicate to device handler 308 an indication of the event. At step 416, device handler 308 may frame a command indicative of the event and communicate such command to command handler 322 of information handling resource 304. At step 418, command handler 322 may receive the command and call event handler 327. At step 420, event handler 327 may retrieve the indicator code behavior for the event from a table in flash 306 or another computer-readable medium integral to or otherwise accessible to information handling resource 304, and apply the indicator code behavior to indicator 328. After completion of step 420, method 400 may end.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor; and
   a management controller communicatively coupled to the processor for out-of-band management of the information handling system, the management controller configured to:
      receive an event relating to an information handling resource of the information handling system; and
      communicate a command to the information handling resource for applying a customized indicator code behavior to a visual indicator associated with the information handling resource, wherein the customized indicator code behavior is based on a user setting of the customized indicator code behavior for the event.

2. The information handling system of claim 1, wherein the management controller is further configured to:
   in response to receiving the event, determine whether the information handling resource is capable of remote handling of the event in order to apply the customized indicator code behavior; and
   wherein content of the command communicated to the information handling resource is based on whether the information handling resource is capable of remote handling of the event in order to apply the customized indicator code behavior.

3. The information handling system of claim 1, wherein the management controller is further configured to:
   in response to receiving the event, determine whether the information handling resource is capable of remote handling of the event in order to apply the customized indicator code behavior; and
   wherein, if the information handling resource is capable of remote handling of the event in order to apply the customized indicator code behavior, the command comprises an indication of the event received by the management controller, such that the information handling resource, responsive to receiving the command:
      determines the customized indicator code behavior based on the command; and
      applies the customized indicator code behavior.

4. The information handling system of claim 1, wherein the management controller is further configured to:
   in response to receiving the event, determine whether the information handling resource is capable of remote handling of the event in order to apply the customized indicator code behavior; and
   wherein, if the information handling resource is incapable of remote handling of the event in order to apply the customized indicator code behavior, the command comprises the customized indicator code behavior such that the information handling resource may, responsive to receiving the command, apply the customized indicator code behavior set forth in the command.

5. The information handling system of claim 1, wherein responsive to a user setting of the customized indicator code behavior for the event, the management controller is further configured to:
   determine whether the information handling resource is capable of remote handling of the event in order to apply the customized indicator code behavior; and
   responsive to determining that the information handling resource is capable of remote handling of the event in order to apply the customized indicator code behavior, communicate the customized indicator code behavior to the information handling resource for storage by the information handling resource.

6. The information handling system of claim 1, wherein responsive to a user setting of the customized indicator code behavior for the event, the management controller is further configured to:
   determine whether the information handling resource is capable of remote handling of the event in order to apply the customized indicator code behavior; and
   responsive to determining that the information handling resource is incapable of remote handling of the event in order to apply the customized indicator code behavior, store the customized indicator code behavior in a local handling table of the management controller.

7. A method comprising:
   receiving an event relating to an information handling resource of an information handling system; and
   communicating a command to the information handling resource for applying a user-customized indicator code behavior to a visual indicator associated with the information handling resource, wherein the customized indicator code behavior is based on a user setting of the customized indicator code behavior for the event.

8. The method of claim 7, further comprising:
   in response to receiving the event, determining whether the information handling resource is capable of remote handling of the event in order to apply the user-customized indicator code behavior; and
   wherein content of the command communicated to the information handling resource is based on whether the information handling resource is capable of remote handling of the event in order to apply the user-customized indicator code behavior.

9. The method of claim 7, further comprising:
   in response to receiving the event, determining whether the information handling resource is capable of remote handling of the event in order to apply the user-customized indicator code behavior; and
   wherein, if the information handling resource is capable of remote handling of the event in order to apply the user-customized indicator code behavior, the command comprises an indication of the event received, such that the information handling resource, responsive to receiving the command:
      determines the customized indicator code behavior based on the command; and
      applies the customized indicator code behavior.

10. The method of claim 7, further comprising:
    in response to receiving the event, determining whether the information handling resource is capable of remote handling of the event in order to apply the user-customized indicator code behavior; and
    wherein, if the information handling resource is incapable of remote handling of the event in order to apply the user-customized indicator code behavior, the command comprises the user-customized indicator code behavior such that the information handling resource, responsive to receiving the command, applies the user-customized indicator code behavior set forth in the command.

11. The method of claim 7, further comprising, responsive to the user setting of the user-customized indicator code behavior for the event:
    determining whether the information handling resource is capable of remote handling of the event in order to apply the user-customized indicator code behavior; and responsive to determining that the information handling resource is capable of remote handling of the event in order to apply the user-customized indicator code behavior, communicating the user-customized indicator code behavior to the information handling resource for storage by the information handling resource.

12. The method of claim 7, further comprising, responsive to the user setting of the user-customized indicator code behavior for the event:
determining whether the information handling resource is capable of remote handling of the event in order to apply the user-customized indicator code behavior; and
responsive to determining that the information handling resource is incapable of remote handling of the event in order to apply the user-customized indicator code behavior, storing the user-customized indicator code behavior in a local handling table of a management controller.

13. An article of manufacture comprising:
a non-transitory computer-readable medium; and
computer-executable instructions stored on the computer-readable medium, the instructions readable by a processor, the instructions, when read and executed, for causing the processor to:
receive an event relating to an information handling resource of an information handling system; and
communicate a command to the information handling resource for applying a user-customized indicator code behavior to a visual indicator associated with the information handling resource, wherein the customized indicator code behavior is based on a user setting of the customized indicator code behavior for the event.

14. The article of claim 13, the instructions for further causing the processor to:
in response to receiving the event, determine whether the information handling resource is capable of remote handling of the event in order to apply the user-customized indicator code behavior; and
wherein content of the command communicated to the information handling resource is based on whether the information handling resource is capable of remote handling of the event in order to apply the user-customized indicator code behavior.

15. The article of claim 13, the instructions for further causing the processor to:
in response to receiving the event, determine whether the information handling resource is capable of remote handling of the event in order to apply the user-customized indicator code behavior; and
wherein, if the information handling resource is capable of remote handling of the event in order to apply the user-customized indicator code behavior, the command comprises an indication of the event received, such that the information handling resource, responsive to receiving the command:
determines the customized indicator code behavior based on the command; and
applies the customized indicator code behavior.

16. The article of claim 13, the instructions for further causing the processor to:
in response to receiving the event, determine whether the information handling resource is capable of remote handling of the event in order to apply the user-customized indicator code behavior; and
wherein, if the information handling resource is incapable of remote handling of the event in order to apply the user-customized indicator code behavior, the command comprises the user-customized indicator code behavior such that the information handling resource, responsive to receiving the command, applies the user-customized indicator code behavior set forth in the command.

17. The article of claim 13, the instructions for further causing the processor to, responsive to the user setting of the user-customized indicator code behavior for the event:
determine whether the information handling resource is capable of remote handling of the event in order to apply the user-customized indicator code behavior; and
responsive to determining that the information handling resource is capable of remote handling of the event in order to apply the user-customized indicator code behavior, communicate the user-customized indicator code behavior to the information handling resource for storage by the information handling resource.

18. The article of claim 13, the instructions for further causing the processor to, responsive to the user setting of the user-customized indicator code behavior for the event:
determine whether the information handling resource is capable of remote handling of the event in order to apply the user-customized indicator code behavior; and
responsive to determining that the information handling resource is incapable of remote handling of the event in order to apply the user-customized indicator code behavior, store the user-customized indicator code behavior in a local handling table of a management controller.

* * * * *